US010685298B2

(12) United States Patent
Faulhaber et al.

(10) Patent No.: US 10,685,298 B2
(45) Date of Patent: *Jun. 16, 2020

(54) MOBILE APPLICATION COMPATIBILITY TESTING

(71) Applicant: Flexera Software LLC, Itasca, IL (US)

(72) Inventors: Michael J. Faulhaber, Batavia, IL (US); James T. Gibson, South Barrington, IL (US)

(73) Assignee: Flexera Software LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,938

(22) Filed: Aug. 19, 2019

(65) Prior Publication Data

US 2020/0042911 A1 Feb. 6, 2020

Related U.S. Application Data

(63) Continuation of application No. 14/813,053, filed on Jul. 29, 2015, now Pat. No. 10,387,809.

(51) Int. Cl.
*G06Q 10/06* (2012.01)
*G06Q 30/02* (2012.01)

(52) U.S. Cl.
CPC .................. *G06Q 10/063* (2013.01)

(58) Field of Classification Search
CPC ........ G06Q 10/06; G06Q 30/02; H04L 63/08; H04L 41/00
USPC ...................................................... 705/7.11
See application file for complete search history.

(56) References Cited

U.S. PATENT DOCUMENTS

| 8,856,748 | B1* | 10/2014 | Larsen | G06F 11/3668 717/125 |
| 9,152,694 | B1* | 10/2015 | Padidar | G06F 21/51 |
| 9,323,643 | B1* | 4/2016 | Julkunen | G06Q 30/02 |
| 10,387,809 | B2* | 8/2019 | Faulhaber | G06Q 10/063 |
| 2010/0233996 | A1* | 9/2010 | Herz | H04L 63/08 455/411 |
| 2011/0145920 | A1* | 6/2011 | Mahaffey | G06F 21/564 726/22 |
| 2013/0227683 | A1* | 8/2013 | Bettini | G06F 21/57 726/22 |
| 2014/0337528 | A1* | 11/2014 | Barton | H04L 41/00 709/225 |

* cited by examiner

*Primary Examiner* — Nga B Nguyen
(74) *Attorney, Agent, or Firm* — Knobbe, Martens, Olson & Bear, LLP

(57) ABSTRACT

Application compatibility testing for mobile applications enables enterprises to improve the extraction of mobile application suitability features (MASFs) from an App using techniques other than reading the package's manifest. In addition to performing dependency analysis in the open package format context, embodiments of the invention interpret the analysis results in the context of mobile devices where, in addition to binary, i.e. go/no go, OS compatibility, there is compatibility testing for other suitability metrics, such as enterprise policy compliance and device capability and/or compliance. A MASF results dictionary keeps track of the various identified hardware and software interfaces of the App.

9 Claims, 27 Drawing Sheets

Application Manager-SCHDTGIBSON7 (June 24th) - jamesgibson

Application Manager | Catalog | Test Center | Report Center | Support

Execute Tests | Launch Wizard | Conflict Web Test | Launch Resolve Issues | Stop | Select Tests to Execute | Select Tests to Execute | Print | Help | Support

Test and Resolve

Products
- Applications
  - Evernote
    - Evernote (v5.2.3) [1]

Evernote
Test Center Deployment Type View

| Summary | Operating System Compatibility | Best Practices and Risk Assessment |

| Test Category | Executed | Errors | Warnings | Auto Fix Available | Issues Suppressed | Overall Assessment |
|---|---|---|---|---|---|---|
| Operating System Compatibility | | | | | | ○ |
| iOS 8 32-bit | 0 | 0 | 0 | - | 0 | ○ |
| iOS 7 32-bit | 0 | 0 | 0 | - | 0 | ○ |
| iOS 6 32-bit | 0 | 0 | 0 | - | 0 | ○ |
| iOS 8 64-bit | 0 | 0 | 0 | - | 0 | ○ |
| iOS 7 64-bit | 0 | 0 | 0 | - | 0 | ○ |
| Best Practices and Risk Assessment | | | | | | ○ |
| Apple Best Practices | 0 | 0 | 0 | - | 0 | ○ |
| Apple Mobile Risk Assessment | 0 | 0 | 0 | - | 0 | ○ |

Output
Select Tests to Execute

Select Tests to Execute

Select the tests you want to execute during package import and when testing is initialized on the Test Center tab.
These settings are stored in the Application Catalog.

Available Tests

- ☐ Application Conflicts
- ☐ Application Virtualization Compatibility
- ☐ Best Practices and Risk Assessment
  - ☑ Apple Best Practices
  - ☐ Microsoft App-V Best Practices
  - ☑ Mobile Risk Assessment
    - ☐ Android Mobile Risk Assessment
    - ☑ Apple Mobile Risk Assessment
    - ☐ Windows Mobile Risk Assessment
  - ☐ Web Deploy Best Practices
  - ☐ Windows Installer Best Practices
  - ☐ Windows Installer Internal Consistency Evaluators
- ☐ Browser Compatibility
- ☐ Operating System Compatibility
  - ☑ Apple
    - ☑ Mobile
      - ☑ 64-bit
        - ☑ iOS 7 64-bit
        - ☑ iOS 8 64-bit
      - ☑ 32-bit
  - ☐ Google
  - ☐ Microsoft
- ☐ Remote Application Publishing Compatibility

Configure Tests

Select the tests you want to execute during package import and when testing is initialized on the Test Center tab.

These settings are stored in the Application Catalog.

To enable a test to run by default, check the check-box against a test, or clear the check-box to disable running a test by default.

Test Configuration Wizard

OK   Cancel   Help

| Test Category | Executed | Errors | Warnings | Auto Fix Available | Issues Suppressed | Overall Assessment |
|---|---|---|---|---|---|---|
| Operating System Compatibility | | | | | | |
| iOS 8 32-bit | 0 | 0 | 0 | - | 0 | ○ |
| iOS 7 32-bit | 0 | 0 | 0 | - | 0 | ○ |
| iOS 6 32-bit | 0 | 0 | 0 | - | 0 | ○ |
| iOS 8 64-bit | 0 | 0 | 0 | - | 0 | ○ |
| iOS 7 64-bit | 0 | 0 | 0 | - | 0 | ○ |
| Best Practices and Risk Assessment | | | | | | |
| Apple best Practices | 0 | 0 | 0 | - | 0 | ○ |
| Apple Mobile Risk Assessment | 0 | 0 | 0 | - | 0 | ○ |

FIG. 5L

| Test Category | Executed | Errors | Warnings | Auto Fix Available | Issues Suppressed | Overall Assessment |
|---|---|---|---|---|---|---|
| Operating System Compatibility | | | | | | |
| iOS 8 32-bit | 5 | 0 | 0 | - | 0 | ⊘ |
| iOS 7 32-bit | 1 | 0 | 0 | - | 0 | ⊘ |
| iOS 6 32-bit | 1 | 0 | 0 | - | 0 | ⊘ |
| iOS 8 64-bit | 1 | 0 | 0 | - | 0 | ⊘ |
| iOS 7 64-bit | 1 | 0 | 0 | - | 0 | ⊘ |
| Best Practices and Risk Assessment | | | | | | |
| Apple best Practices | 56 | 0 | 13 | - | 0 | ⚠ |
| Apple Mobile Risk Assessment | 4 | 0 | 4 | - | 0 | ⚠ |
| | 52 | 0 | 9 | - | 0 | ⚠ |

FIG. 5M

Application Manager-SCHDTGIBSON7 (June 24th) - jamesgibson

Application Manager | Catalog | Test Center | Report Center | Support

New Group | Import | Cancel Import | Help Contents | Support

Packages

Environment
- Enterprise Policy Configurations
  - iPhoneTest1
    - Security Patches
    - New Security Patches
    - Snapshots iPhoneTest1
Enterprise Policy Views

| | |
|---|---|
| Password | |
| Allow simple value | true |
| Requires passcode | true |
| Maximum number of failed attempts | 10 |
| Maximum passcode age | 50 |
| Minimum number complex characters | 1 |
| Minimum passcode length | 1 |
| Passcode history | 1 |
| Maximum grace period for device lock | 240 |
| Require alphanumeric value | true |
| Maximum Auto-Lock | 15 |
| Assistant | |
| Allow siri | true |
| Assistant to query user generated content | Not set |
| Allow Siri while device is locked | true |
| Bookstore | |
| Allow iBookstore purchases | Not set |
| Allow iBookstore erotica | true |
| Camera | |
| Allow use of camera | true |
| Allow Photo Stream (disallowing can cause data loss) | true |
| Allow screen capture | |
| Cloud | |

Products | Merge Modules | Environment

Ready

*FIG. 5R*

MOBILE APPLICATION COMPATIBILITY TESTING

PRIORITY CLAIM

This application is a continuation of U.S. patent application Ser. No. 14/813,053, filed Jul. 29, 2015, titled "METHOD AND APPARATUS FOR EXTRACTING MOBILE APPLICATION SUITABILITY FEATURES FOR A MOBILE BUSINESS APPLICATION," the disclosure of which is hereby incorporated herein by reference.

FIELD

The disclosure relates to mobile application compatibility testing, and to the identification of mobile application suitability features.

BACKGROUND

There are many different potential mobile business applications (Apps) that can be allowed to run within an enterprise. Such Apps are typically single-file digital publications (packages) and are typically similar in structure to the Open Packaging Format (OPF). See FIG. 1.

For each application, an enterprise must determine the suitability of the App before allowing users to install the App. These Apps can be analyzed to determine which hardware and software features on the installed devices may be used or required. Based on this analysis, the enterprise may determine if an App is compatible with the capabilities of the user's devices and is also compliant with the enterprise's policies. Typically, a manifest may be included in the App package that describes a subset of the mobile application suitability features (MASFs). However, the manifest may be falsified or it may otherwise present an incorrect or incomplete representation of the Apps capabilities and compatibility.

Products, such as AdminStudio® (Flexera Software), test for application compatibility for other installer package formats, for example Windows Installers (MSIs). See FIG. 2.

At a high level, the MSI package can be considered to have a section for storing metadata and properties of the installer package, as well as binaries and resources that are installed on the target machine. Products, such as AdminStudio®, do not perform a dynamic analysis of a target package. Instead, such products can analyze the binaries and resources in the package for dependencies and compatibility to a given operating system (OS).

It would be advantageous to provide application compatibility testing for mobile applications.

SUMMARY

Embodiments of the invention provide application compatibility testing for mobile applications. This enables enterprises to improve the extraction of mobile application suitability features (MASFs) from an App using techniques in addition to, and other than, reading the package's manifest. In addition to performing dependency analysis in the open package format context, embodiments of the invention interpret the analysis results in the context of mobile devices where, in addition to binary, i.e. go/no go, OS compatibility, there is compatibility testing for other suitability metrics, such as enterprise policy compliance and device capability and/or compliance. Embodiments of the invention accumulate MASF results in a dictionary that keeps track of the various identified hardware and software interfaces of the App.

DRAWINGS

Figure 5A:
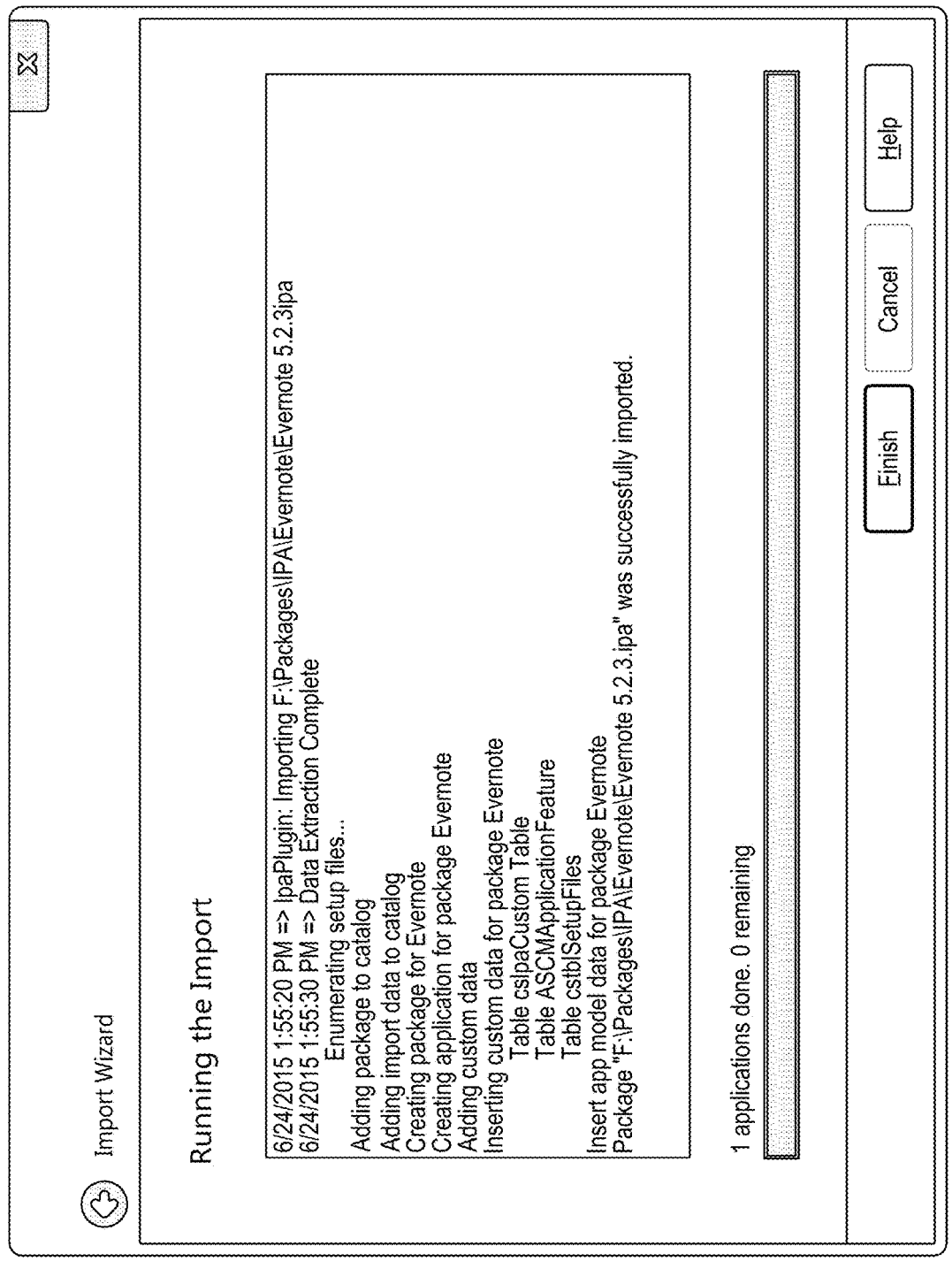
Figure 6A:
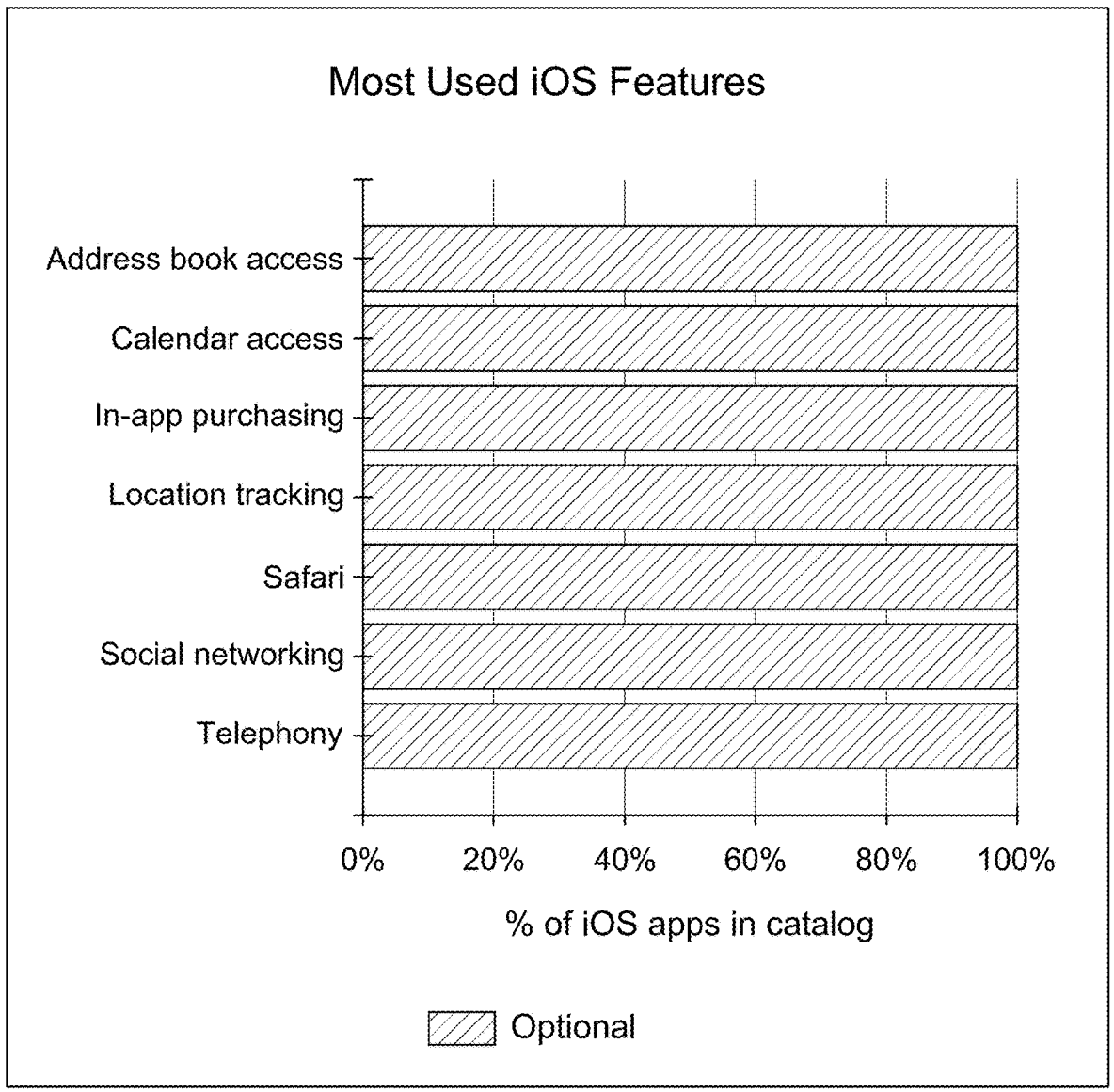
Figure 6B:
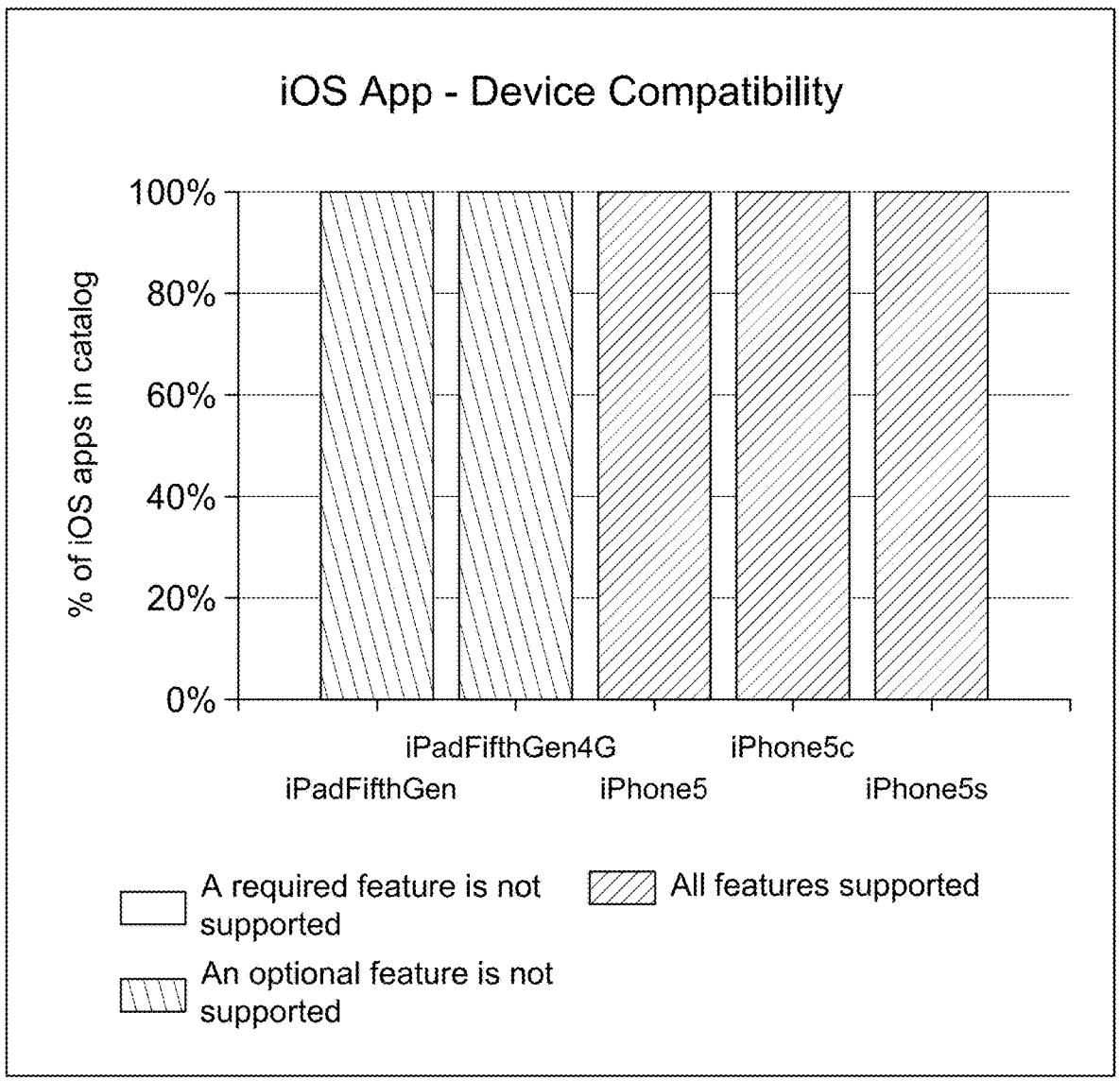
Figure 6C:
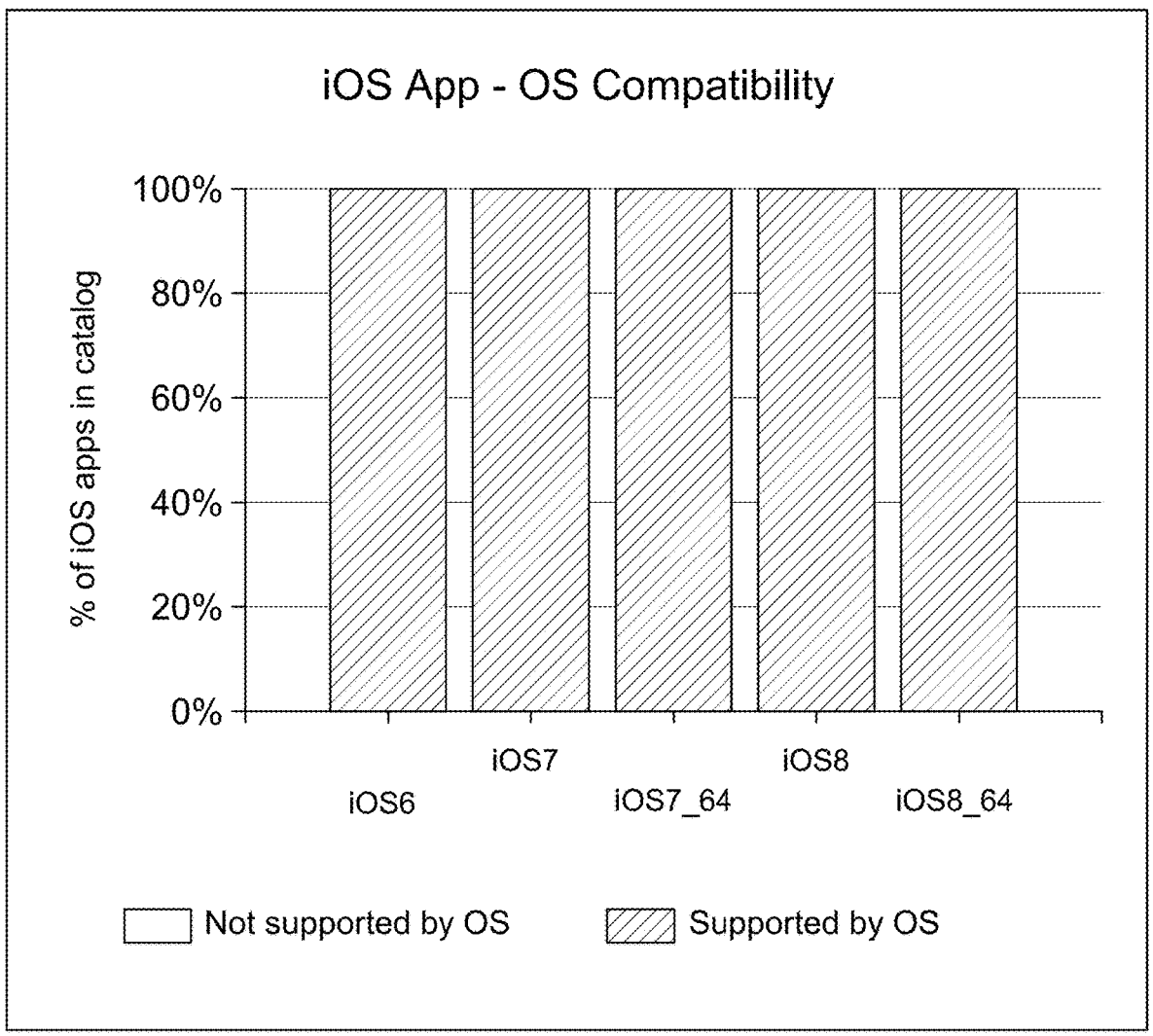
Figure 6D:
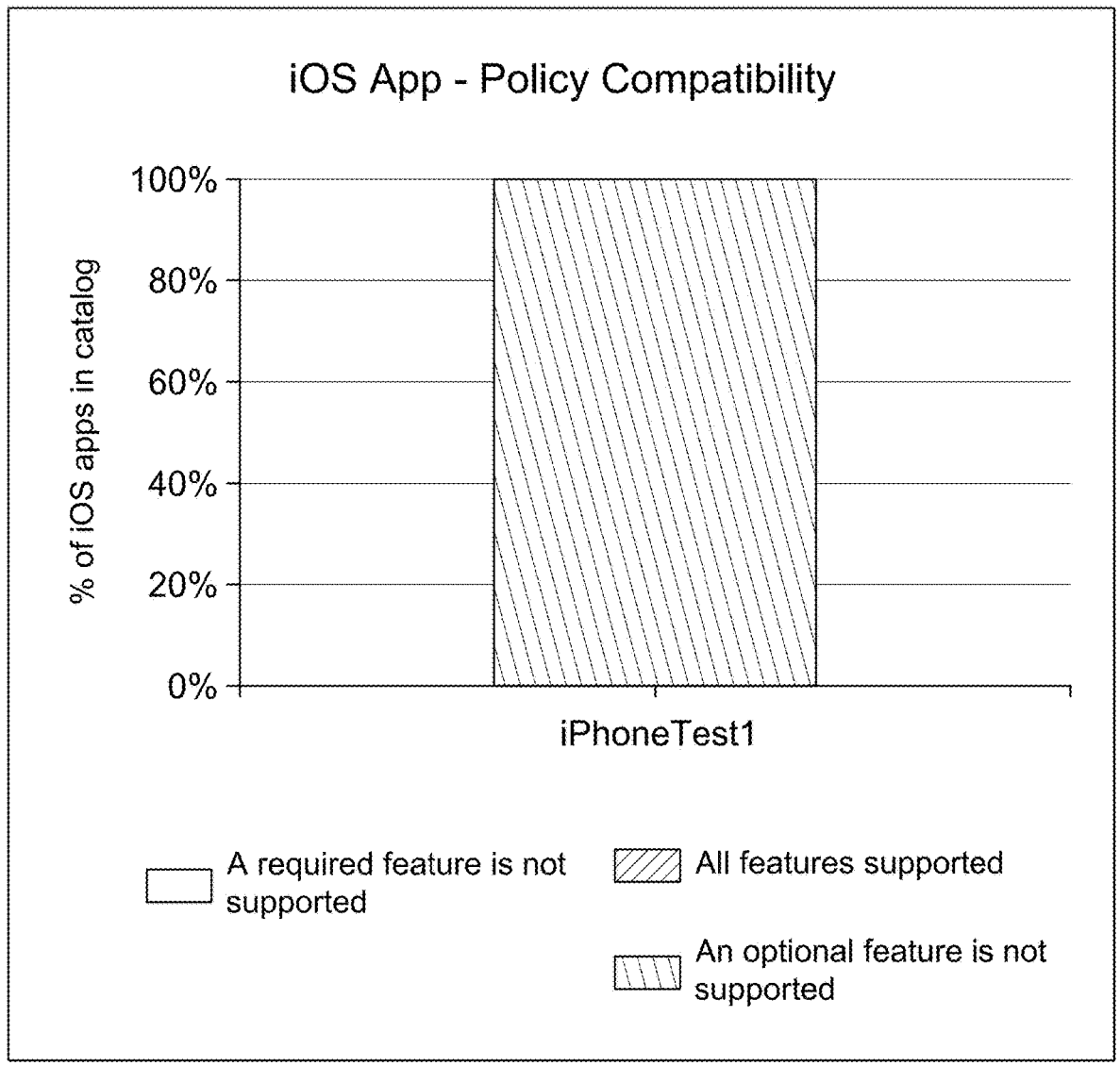
Figure 7:
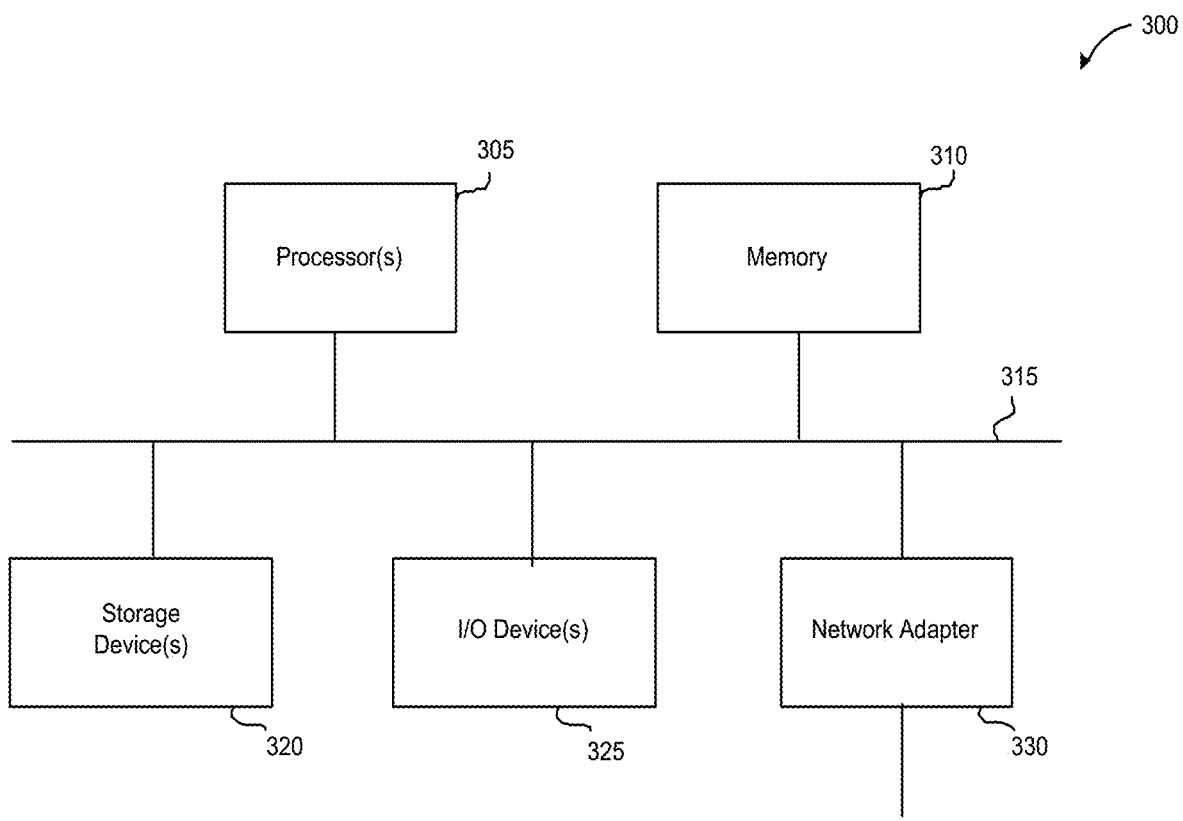

FIGS. 5A-5R provide a series of screen shots that show operation of an embodiment of the invention;

FIGS. 6A-6D provide a series of reports generated by an embodiment of the invention; and FIG. 7 is a block schematic diagram showing a machine in the example form of a computer system within which a set of instructions for causing the machine to perform one or more of the methodologies discussed herein may be executed.

DETAILED DESCRIPTION

Embodiments of the invention provide application compatibility testing for mobile applications. This enables enterprises to improve the extraction of mobile application suitability features (MASFs) from an App using techniques in addition to, and other than, reading the package's manifest. In addition to performing dependency analysis in the open package format context, embodiments of the invention interpret the analysis results in the context of mobile devices where, in addition to binary, i.e. go/no go, OS compatibility, there is compatibility testing for other suitability metrics, such as enterprise policy compliance and device capability and/or compliance.

Embodiments of the invention accumulate MASF results in a dictionary that keeps track of the various identified hardware and software interfaces of the App. The processes by which embodiments of the invention extract information from multiple package-internal sources are executed pursuant to an algorithm.

For example, for each package type, the file structure is well defined and relevant files are selected for parsing. The MASFD is structured so that the appropriate analyzer only leverages the subset of the MASFD entries that are to be applied to the particular file and package type. For xml or plist files, the file's data elements are contained in a tree-like structure. Reading this structure is a common practice and there are many publicly available libraries for navigating this tree structure and retrieving select elements of the tree. Elements and their values are evaluated for matches stored in the MASFD. For other file types, including partially encrypted binary files, the entire file is treated as a string against which substring matching to MASFD entries is performed. When a file with related MASFD entries contains a matching value or substring associated with that same MASFD entry, the MASFD defines what particular MASF for that App is detected and subsequently stored in the MASFRD.

A key aspect of the invention is the extraction of a superset of features to evaluate a mobile App in the open package format from beyond the set explicitly described by a package's manifest or library references of the main executables, and the existence and structure of peripheral resources, to infer additional features of the App, i.e. suitability features are detected and determined to accomplish application compatibility testing for mobile applications.

Entities

Table 1 provides definitions for the various entities that interact in embodiments of the invention.

TABLE 1

Entities

| Invention Entity | Definition |
| --- | --- |
| Mobile Application Suitability Features Dictionary | A reference set of suitability features, their detectable signatures and their disposition. |
| Mobile Application Suitability Features Results Dictionary | An aggregate set of accumulated, detected suitability features, and their properties. |
| Manifest Analyzer | A component responsible for extracting MASFs from the manifest. |
| Main Executable Library Link Analyzer | A component responsible for extracting library-related MASFs from the main executables. |
| Resource Analyzer | A component responsible for extracting resource related MASFs from peripheral files. |

Actions

Figure 1:
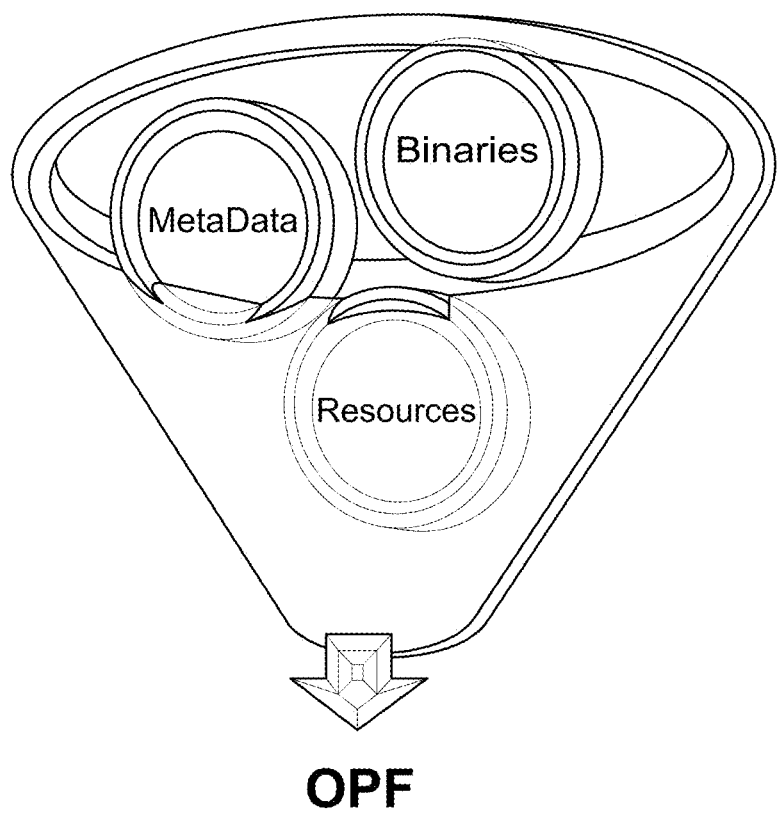
FIG. 1 is a block schematic diagram showing mobile business applications (Apps), typically single-file digital publications (packages) that are typically similar in structure to the open packaging format (OPF), and that are allowed to run within an enterprise.
Figure 2:
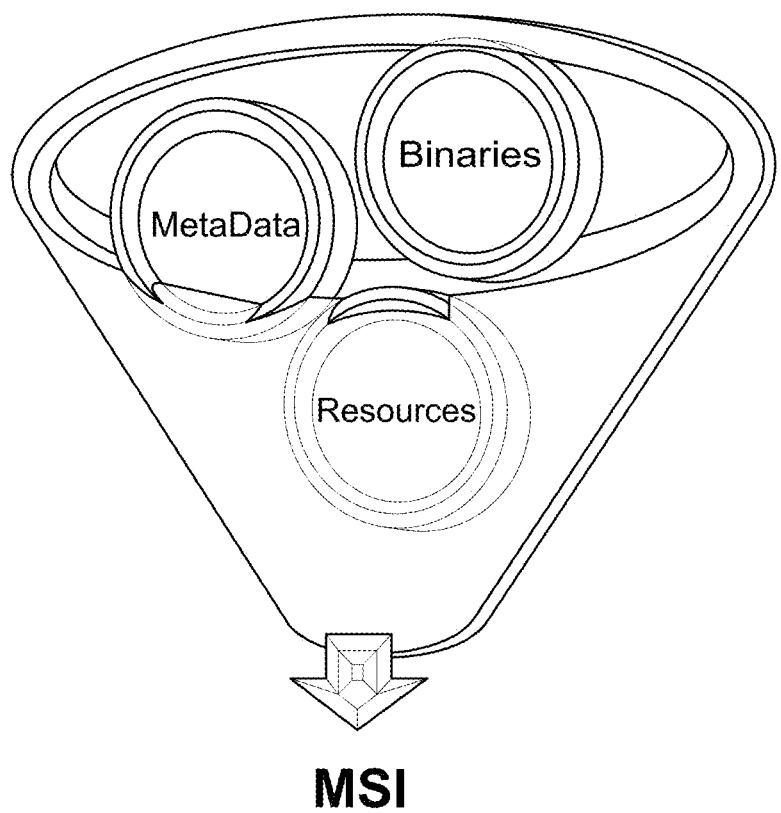
FIG. 2 is a block schematic diagram showing an example of a product, such as AdminStudio® (Flexera Software), that tests for application compatibility for other installer package formats, for example Windows Installers (MSIs)
Figure 3:
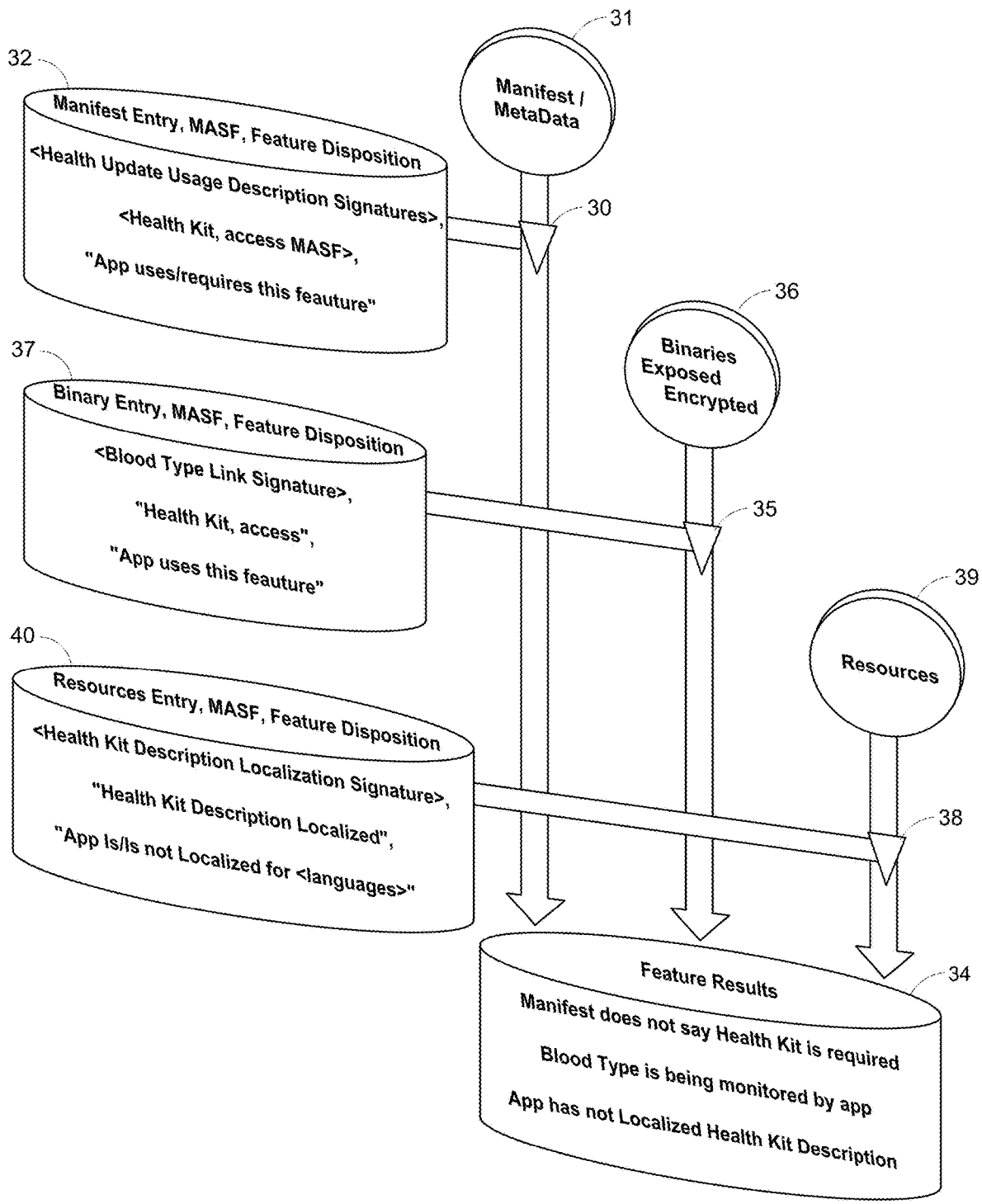
FIG. 3 is a block schematic diagram showing extraction of mobile application suitability features for a mobile business application according to the invention.

FIG. 3 is a block schematic diagram showing extraction of mobile application suitability features for a mobile business application according to the invention. Given an App package, each of one or more analyzers interrogates a different subsection of the package to extract the MASFs. FIG. 3 considers the example of a HealthKit-based App.

In embodiments of the invention, there is an Info.plist file which is the main manifest file for the package. A plist file is a structured xml file. The xml has a CFBundleExecutable tag which signifies the location of the main binary of the package. When parsing the binary file, there are the header, load commands, and data sections in the binary. The load commands are unencrypted and contain library\object\type information. Embodiments of the invention leverage this information.

Also contained in the package are <language>.lproj directories. These contain localization files and plists which can be parsed for localized fields. The names of these fields can be compared to fields enumerated in the main manifest plist file (info.plist). Entries that missing from any location are determined to be deficiencies in proper application localization.

The manifest analyzer 30 extracts MASFs from the package's manifest 31. The manifest directly declares required resources of an application. Referring to the plist and xml features enumerated in the directory/section, and specifically the IPAplist.txt file, some of the features extracted have a disposition "requires" while others are "uses," meaning that the application may require the resource/feature or that it may use the resource/feature. Additionally, "non-localized" and "localized" strings can be detected in the main manifest. The manifests are user modifiable, and some entries are optional.

The binary executable file contains references to the library and, at a higher degree of granularity, objects that the executable uses. One can infer resource or functionality of the application based on the library's resources or functions.

The additional resources in the application package are used in embodiments of the invention to identify language localization resources for the application, and are parsed to determine the extent of the localization support.

The manifest is typically an XML or PLIST format file. As such, extraction is straight forward. The values and metadata extracted from the manifest can explicitly describe the hardware, e.g. the App requires a camera, and software requirements, e.g. OS version. The values may be generated by the same tool chain that creates the main executables in the package, or they may be subsequently modified. The values are matched against the mobile application suitability features dictionary (MASFD) 32.

Some tests compare the enterprise policy specified by the user against the feature set extracted from the main manifest and application functionality inferred from the libraries that are required by the application. These tests determine if the application is compliant with policy. Some tests compare the OS/device capabilities specified by the user against the "required" and "uses" type dispositions in the feature set extracted from the main manifest. These are application compatibility tests. It is also possible to test the OS/device against libraries that are required by the application but that may or may not be supported by the OS/device.

Matches are submitted to the mobile application suitability features results dictionary (MASFD) 34. In the embodiment of the invention shown in FIG. 3, the MASFRD includes the Manifest Entry, MASF, Feature Disposition, e.g. for a HealthKit App, the <Health Update Package Description Signature>, <HealthKit access MASF>, and "App uses/requires this feature."

In the foregoing example, the terms contained in brackets < > are placeholders. For example, <Healthkit access MASF> could be any of the MASFs which represent Healthkit access, etc.

The main executable library link analyzer 35 extracts MASFs from the main executables 36 in the package. A portion of the executable may be encrypted (shown in FIG. 3 with cross hatching) to prevent decompiling and in-depth interrogation. However, the names of libraries, frameworks and, sometimes, classes external to the executable typically remain unencrypted. Only the unencrypted portion of the executable can be parsed statically, away from the target device.

The library references can be an implicit indication of resource consumption by the App. For example, an App leveraging the device's camera may not have an MASF related to the camera extracted from the manifest. However, there is likely to be link to a library or framework associated with the camera in the executable. The values are matched against the mobile application suitability features dictionary (MASFD) 37. The matches are submitted to the mobile application suitability features results dictionary (MASFRD) 34. In the embodiment of the invention shown in FIG. 3, the MASFD includes the Binary Entry, MASF, and Feature Disposition, e.g. for the HealthKit App, the <Blood Type Link Signature>, "HealthKit access," and "App uses this feature."

The resource analyzer 38 extracts MASFs from the remaining files 39. For example, localization and best practices data may be contained in a package's sub-directories in PLIST format.

This information can identify Apps that are missing necessary localizations, for example. The values are matched against the mobile application suitability features dictionary (MASFD) 40. The matches are submitted to the mobile application suitability features results dictionary (MASFRD) 34. In the embodiment of the invention shown in FIG. 3, the MASFD includes the Resource Entry, MASF, and Feature Disposition, e.g. for the HealthKit App, the <HealthKit Description Localization Signature>, "HealthKit Description Localized," and "App Is/Is not Localized for <languages>."

The MASFRD accumulates the feature results to provide a feature set. In the example of FIG. 3, the manifest does not indicate that a HealthKit is required. Thus, no device compatibility issue is declared. The executables indicate that blood type is being monitored by the App. Thus, an enterprise policy violation is detected. The resources indicate that the App has not localized the HealthKit description. Thus, application localization is not supported for this feature.

The MASFRD accumulates the features, their values, and their disposition, differentiating between a suitability feature that represents a hard dependency of the App, one that may be leveraged by the App, or one that describes a deviance from or conformance to best practices. This data is presented as output for downstream processing. For example, the test framework of AdminStudio® assesses the MASFs against a matrix of hardware, software, and enterprise capabilities and requirements.

Implementation in AdminStudio®

Figure 4:
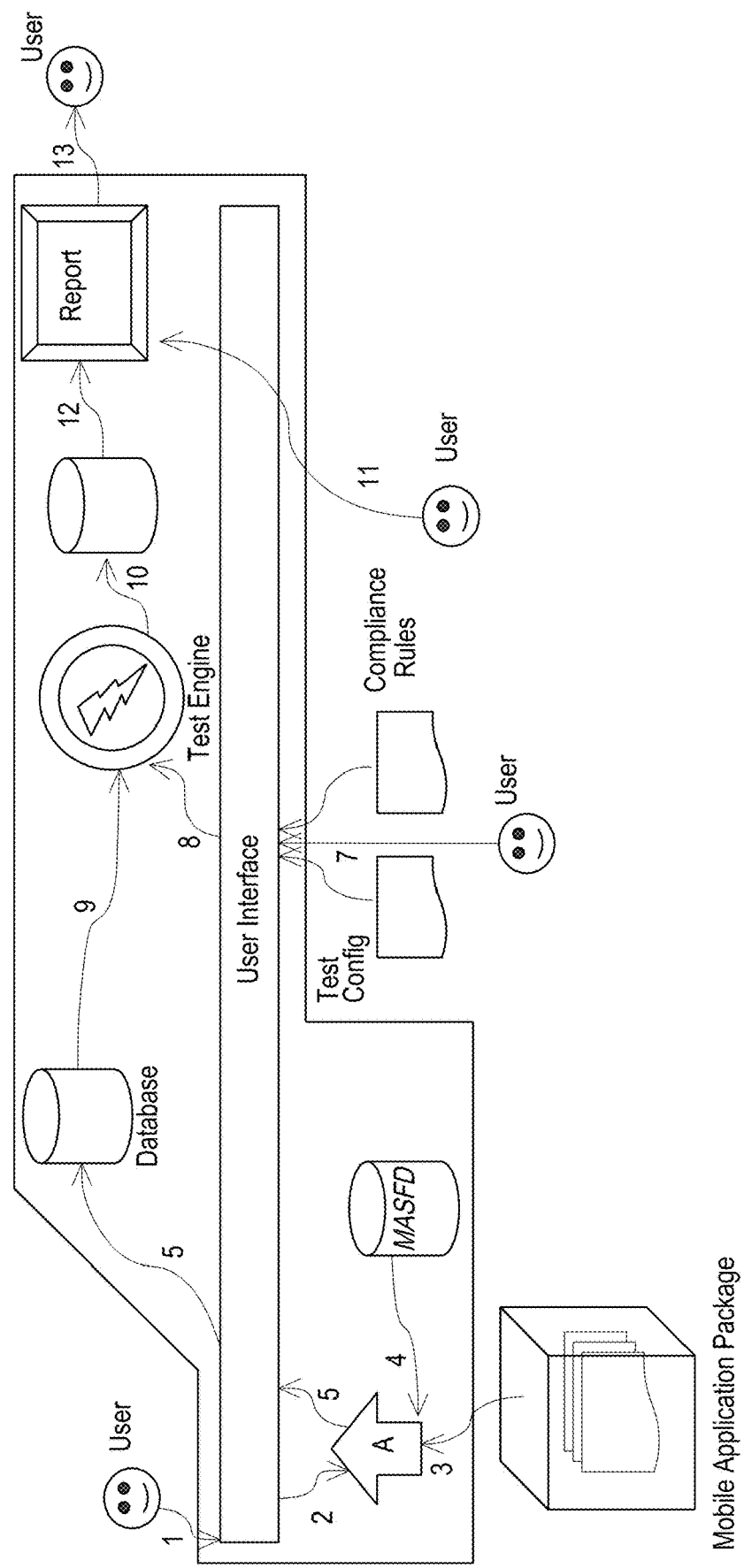
FIG. 4 is a block schematic diagram showing the extraction of mobile application suitability features for a mobile business application in an embodiment of the invention that is implemented in AdminStudio®.

FIG. 4 is a block schematic diagram showing the extraction of mobile application suitability features for a mobile business application in an embodiment of the invention that is implemented in AdminStudio®. Those skilled in the art will appreciate that the invention readily implemented in any other environment.

In FIG. 4 (the following sequence of numbers corresponds to those numbers that are shown on FIG. 4):
1. A user requests an import of an App.
2. A product, such as AdminStudio® (AS), starts the mobile application import module (A) in which analyzers (as discussed above in connection with FIG. 3) are embedded.
3. AS imports a package and extracts metadata and package properties therefrom.
4. The MASFD is compared against parsed package components using the analyzers.
5. The results are stored in the database, e.g. the MASRD, which is a subset of AS's database.
6. Intentionally left blank.
7. The user applies policies and tests configurations, and begins a test of the imported App.
8. A test request is sent by AS to the mobile test engine module.
9. Features from the package are compared against test logic, e.g. best practices, compliance, compatibility rule sets, and policy rules.
10. The test results are stored in the database.
11. The user requests a report from AS.
12. A report is generated from the database.
13. The report is served by AS to the user.

Figure 5B:
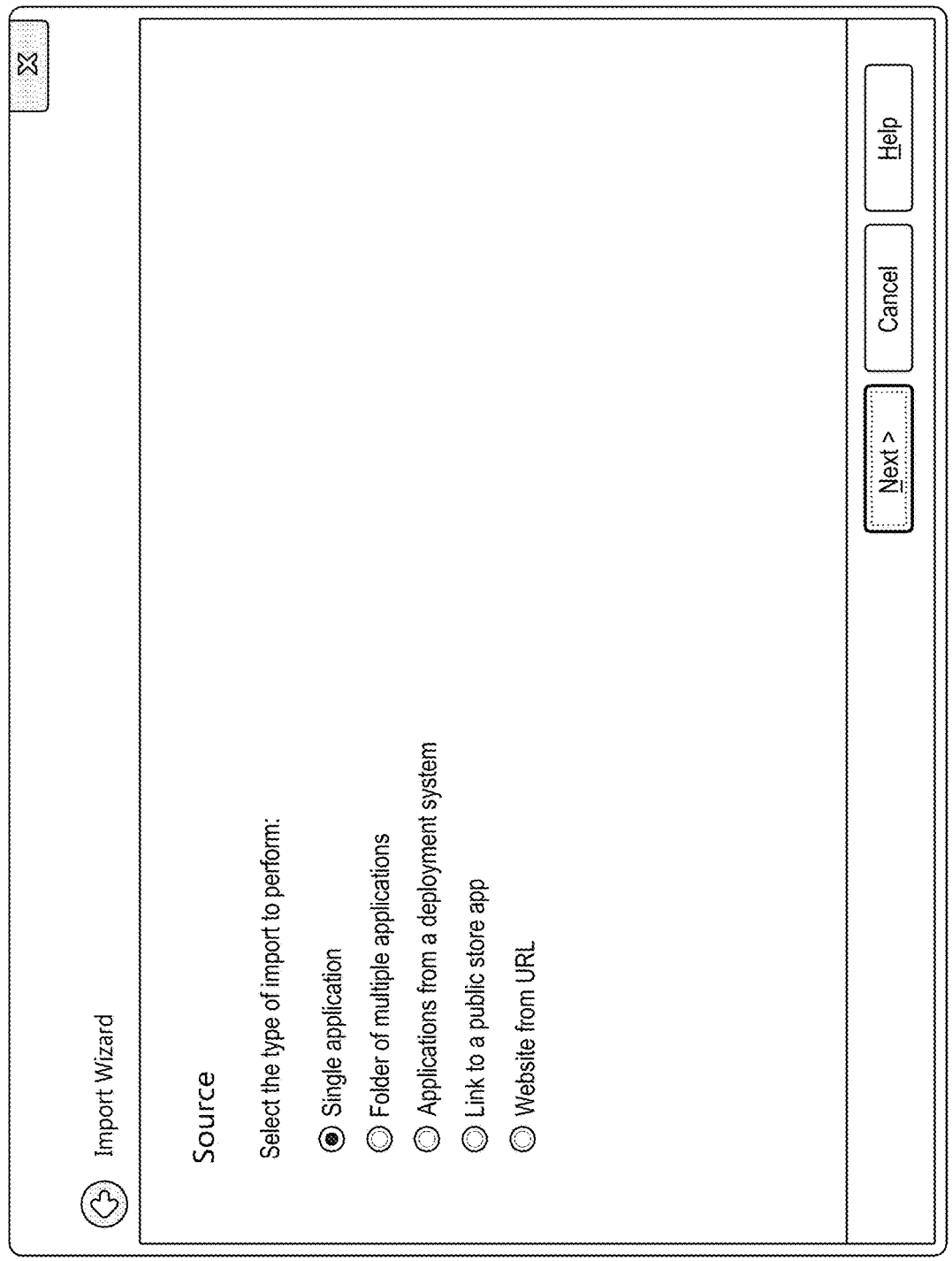
Figure 5C:
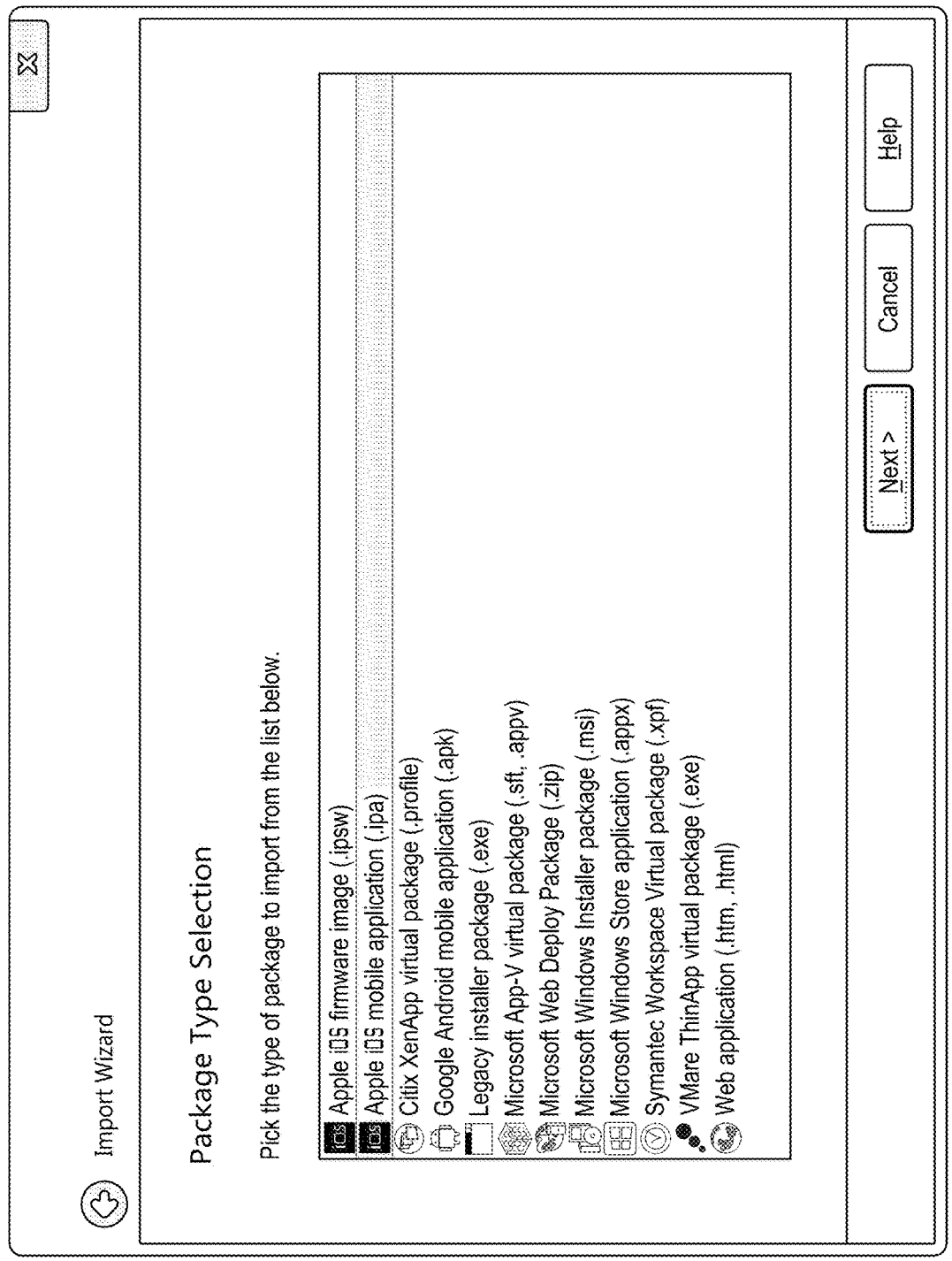
Figure 5D:
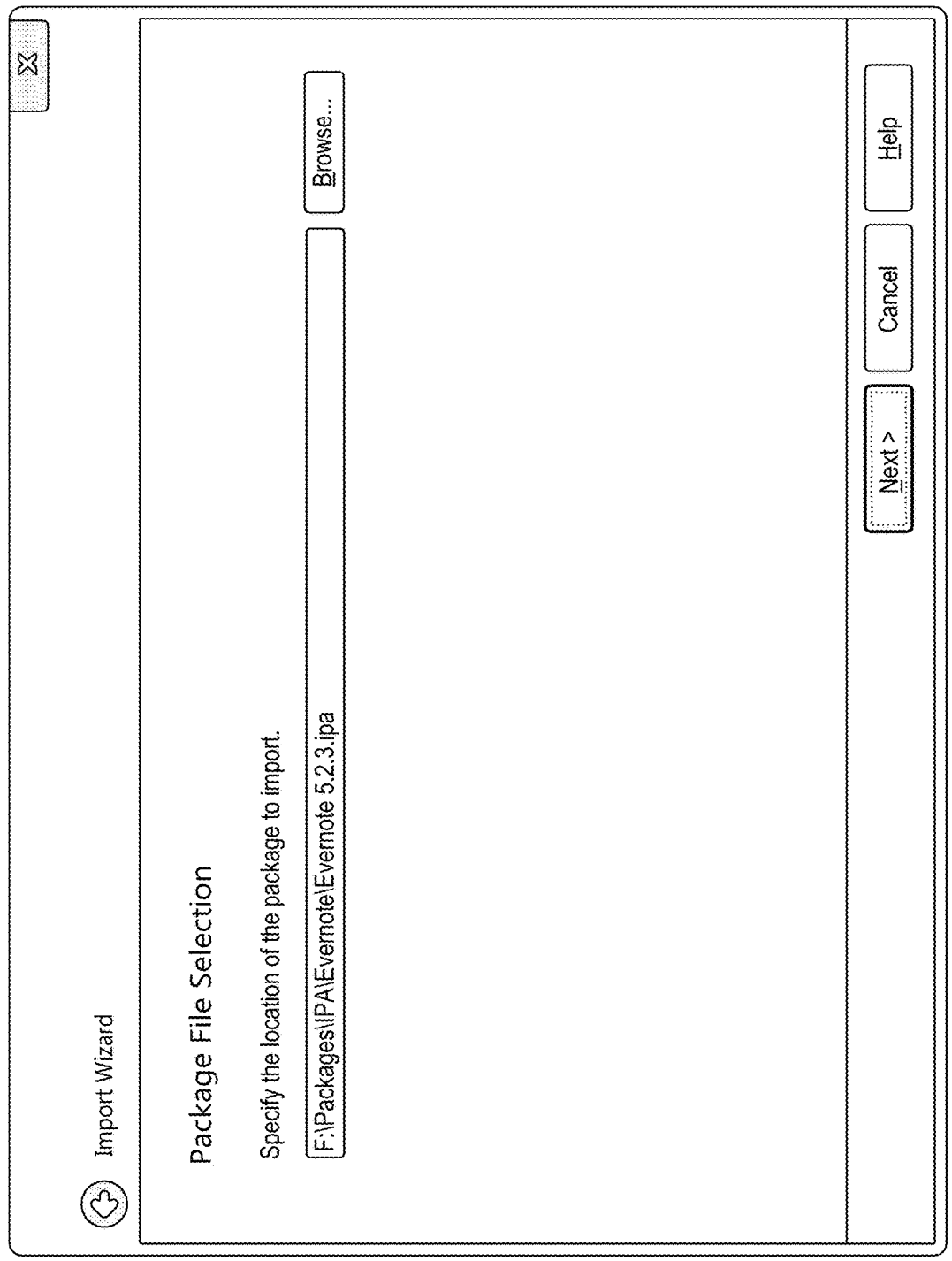
Figure 5E:
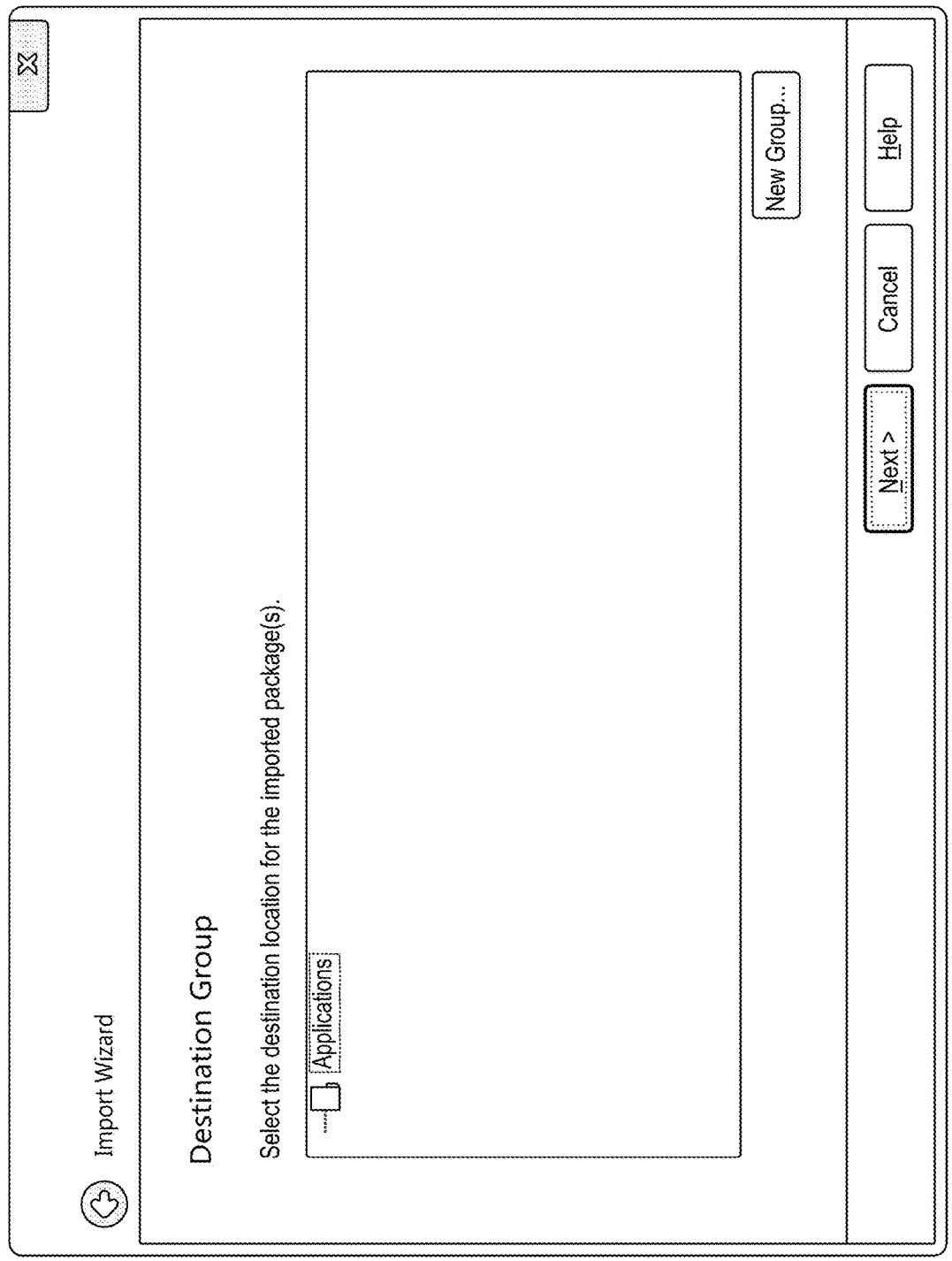
Figure 5F:
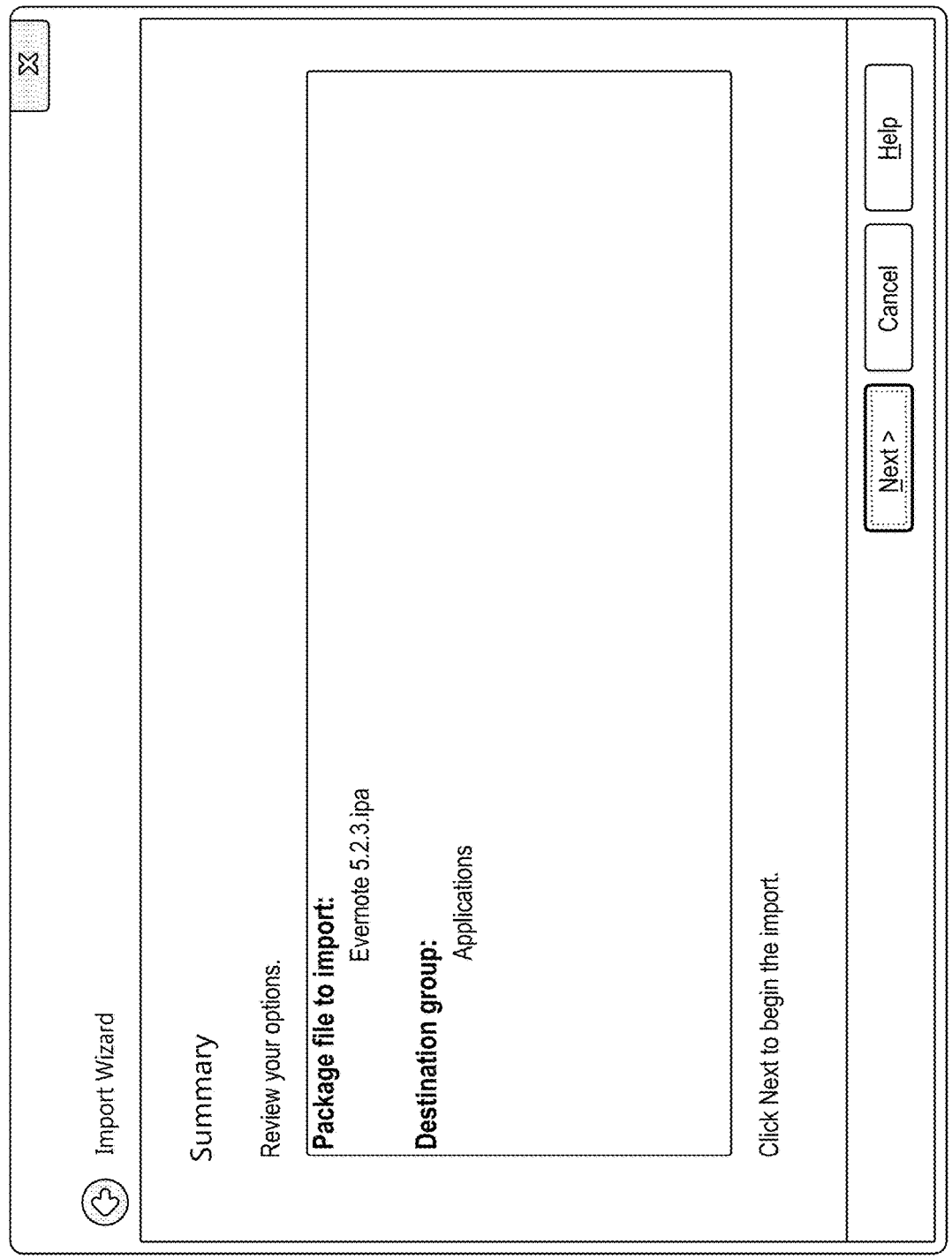
Figure 5G:
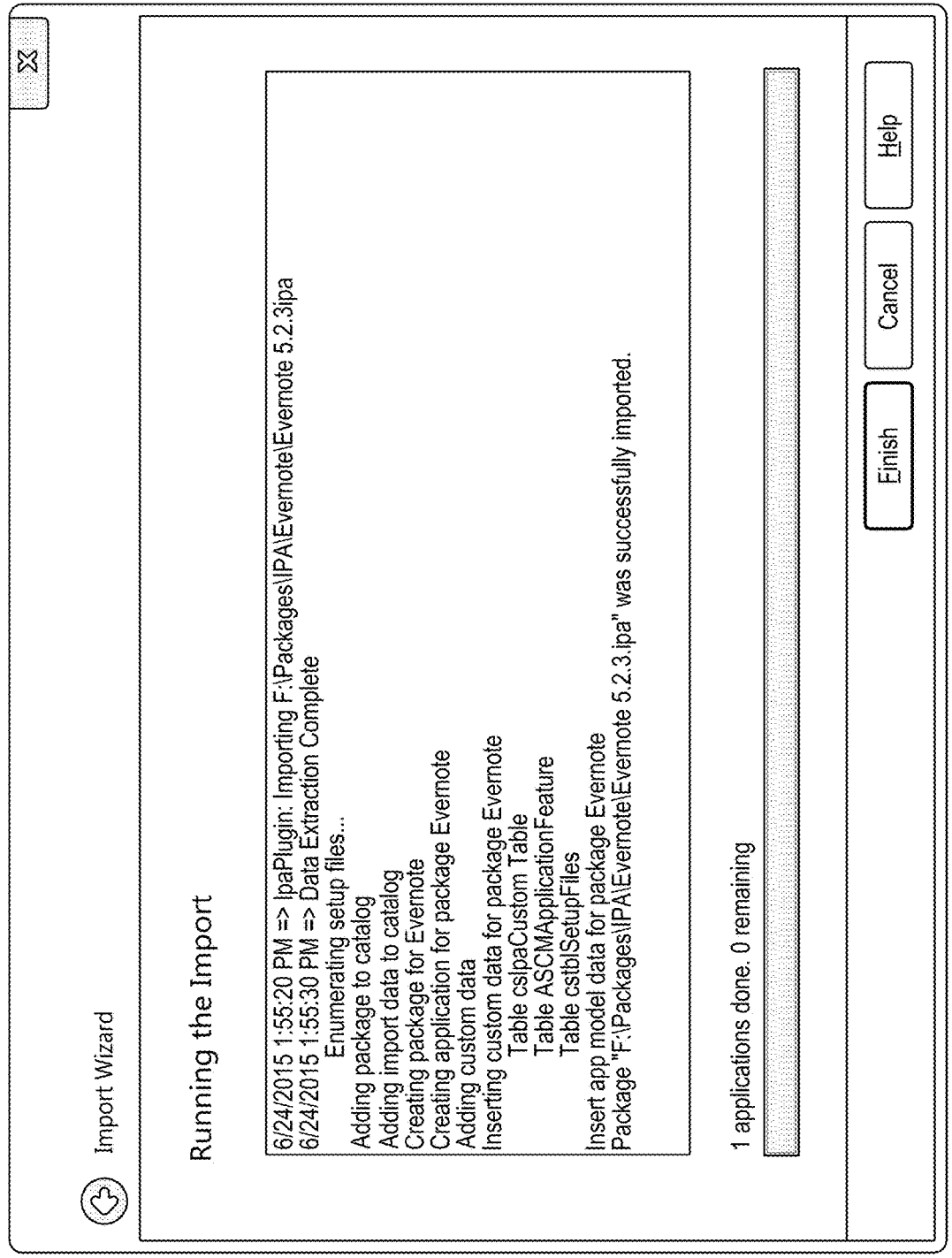
Figure 5H:
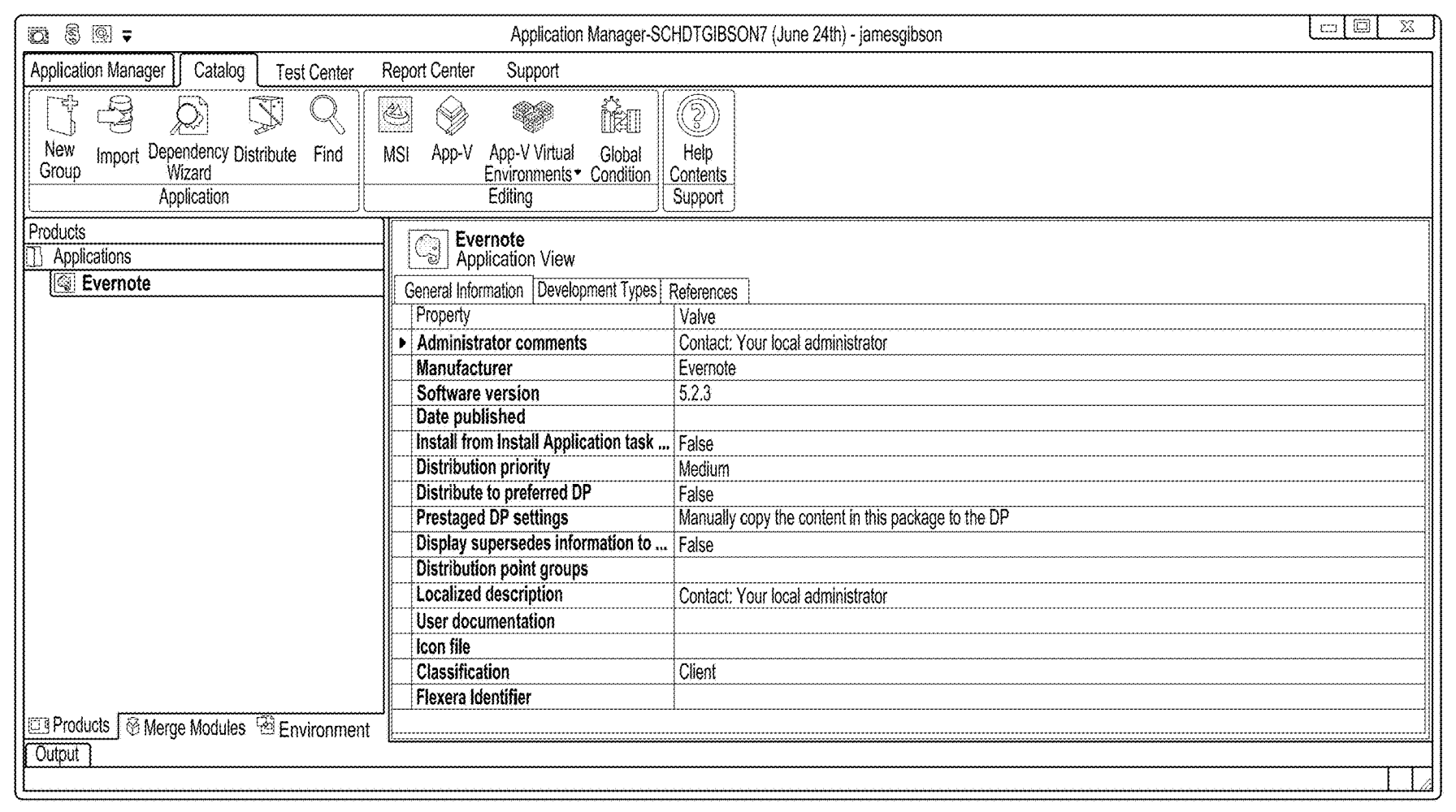
Figure 5M:
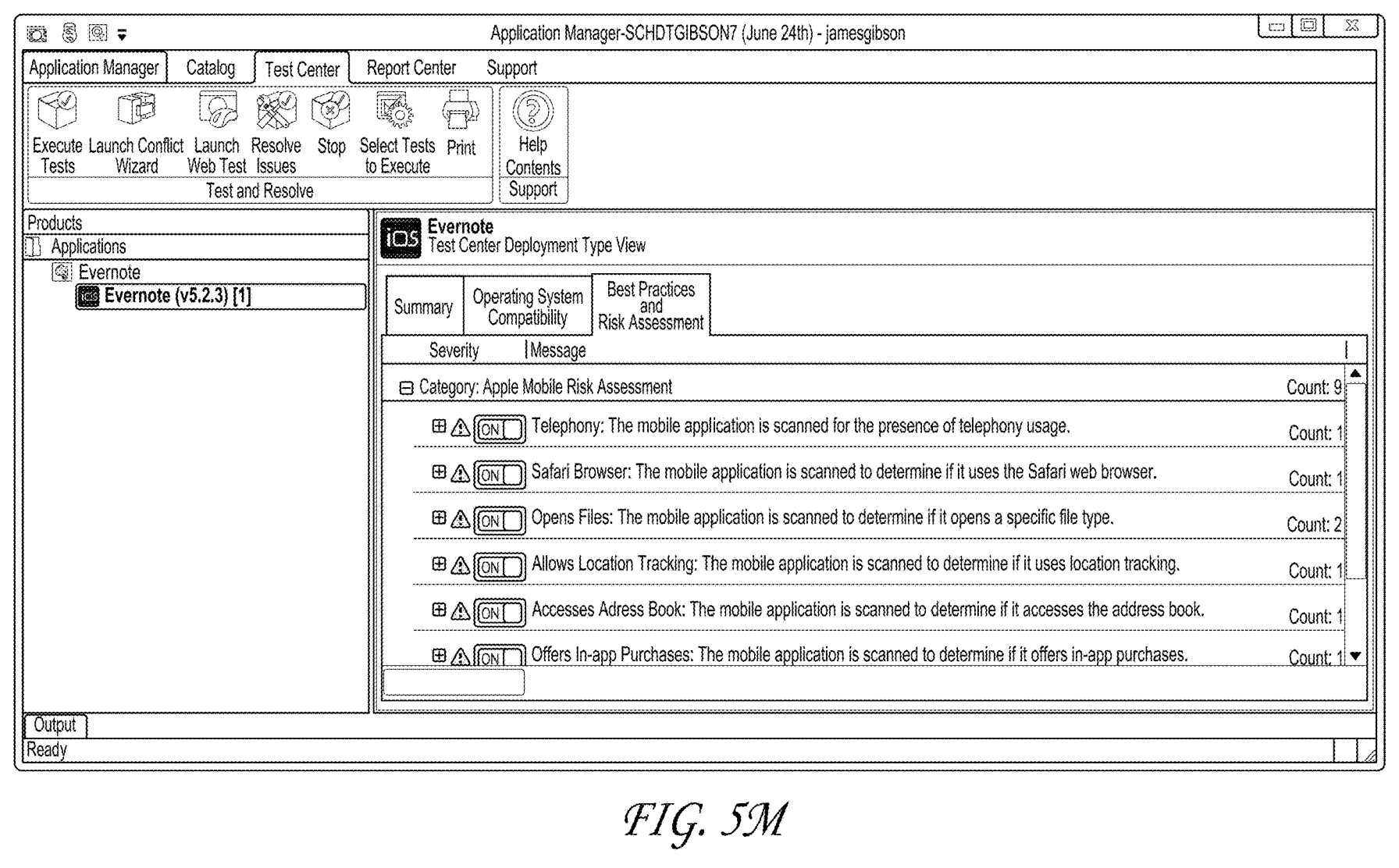
Figure 5N:
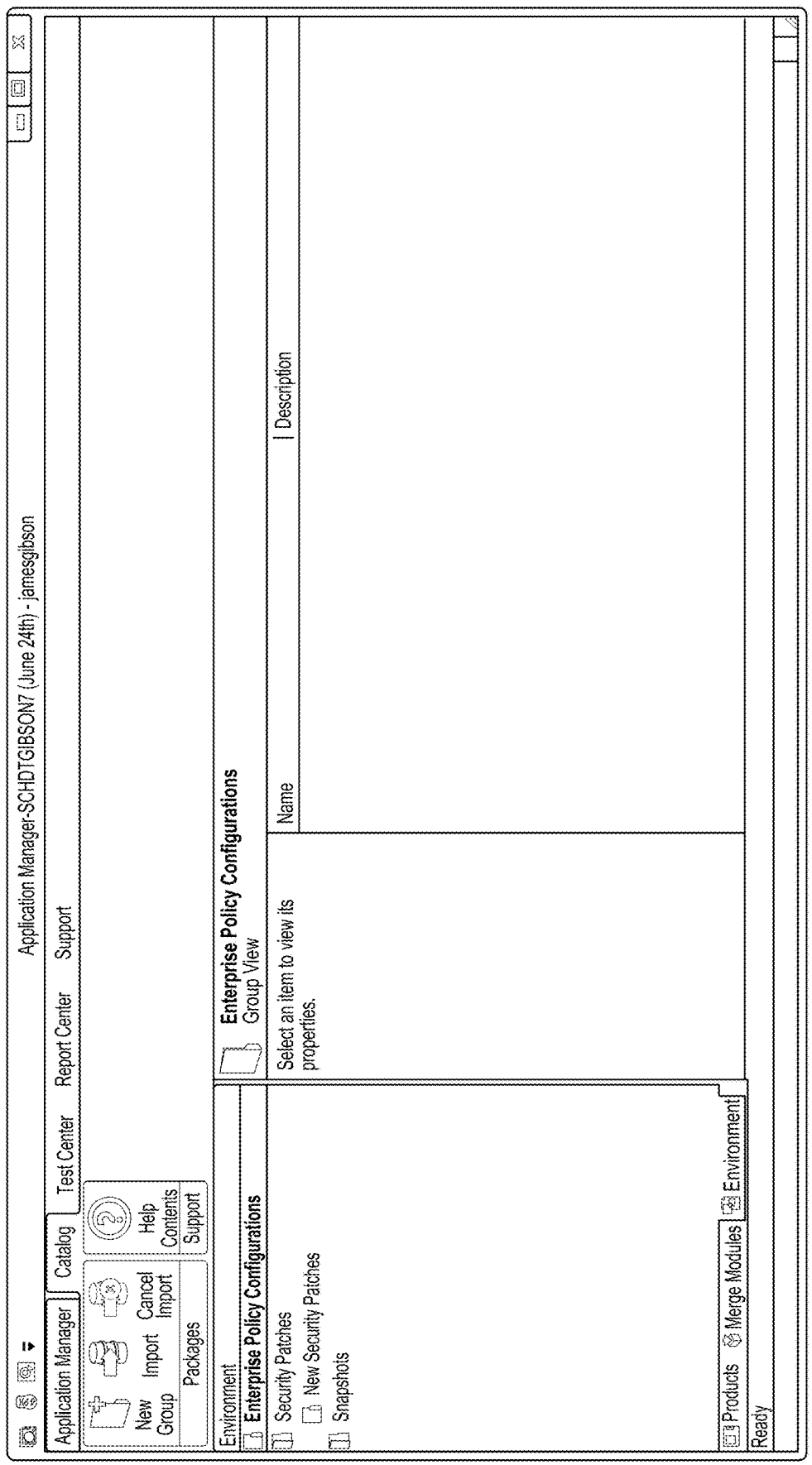
Figure 50:
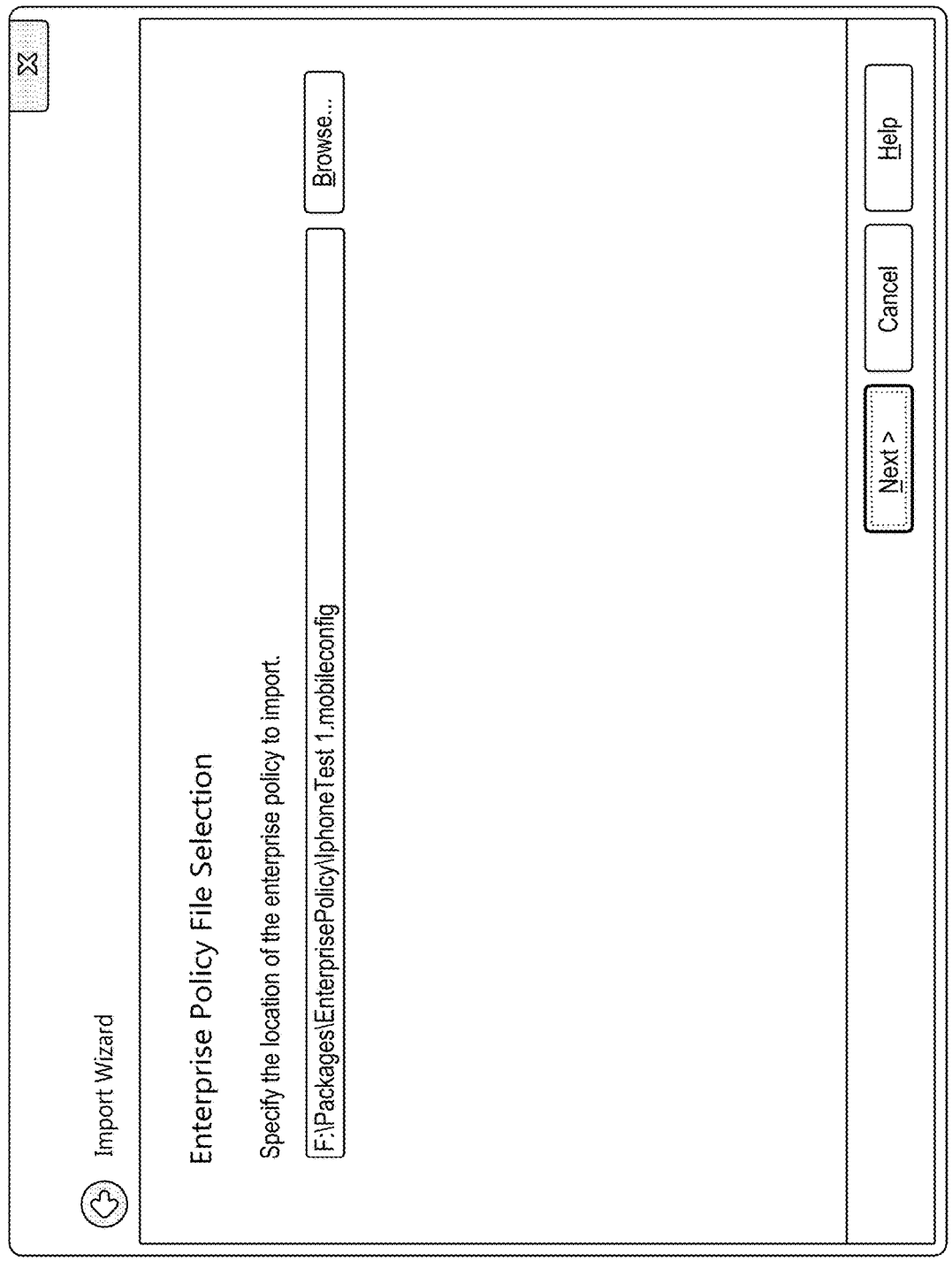
Figure 5P:
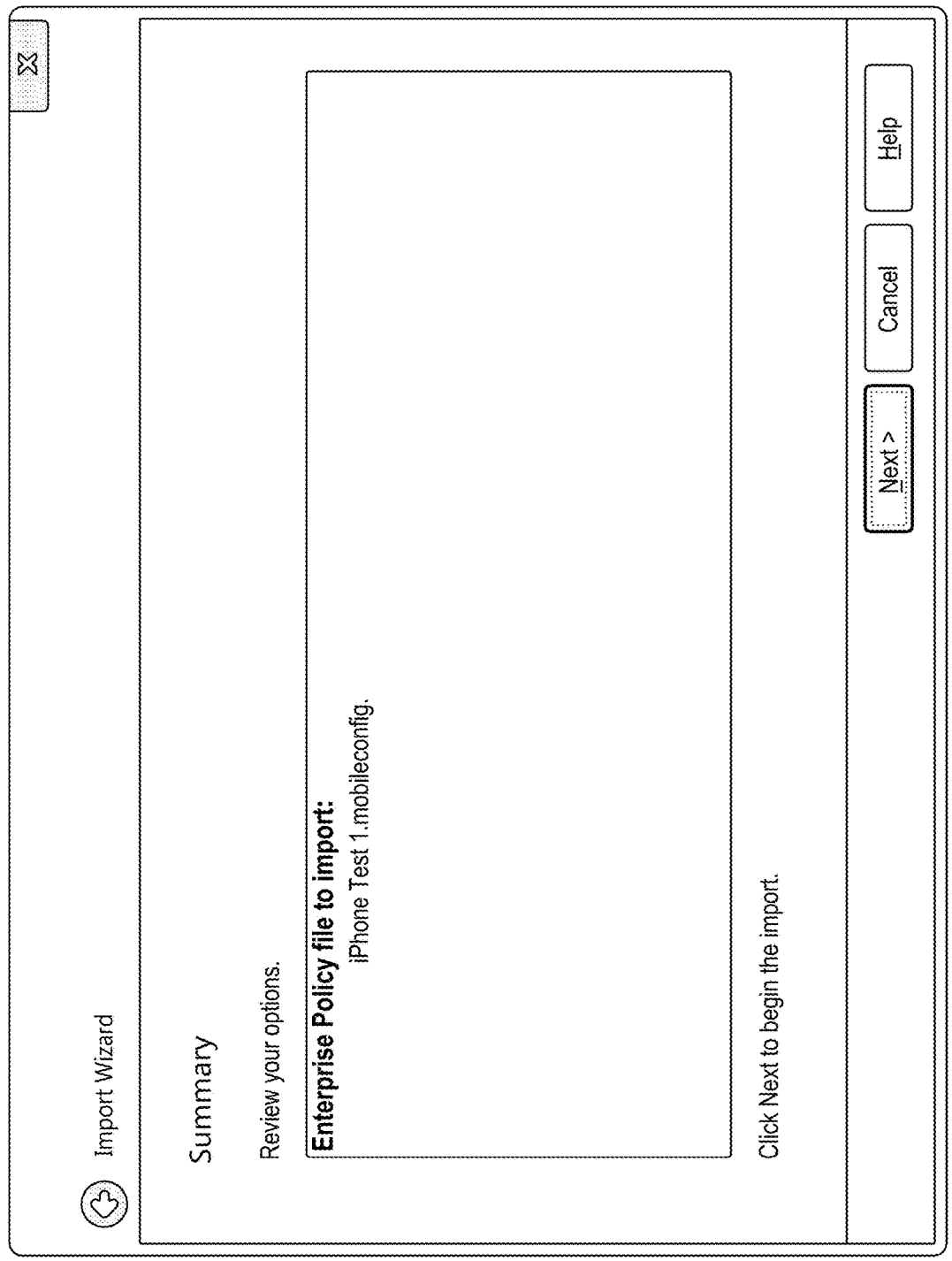
Figure 5Q:
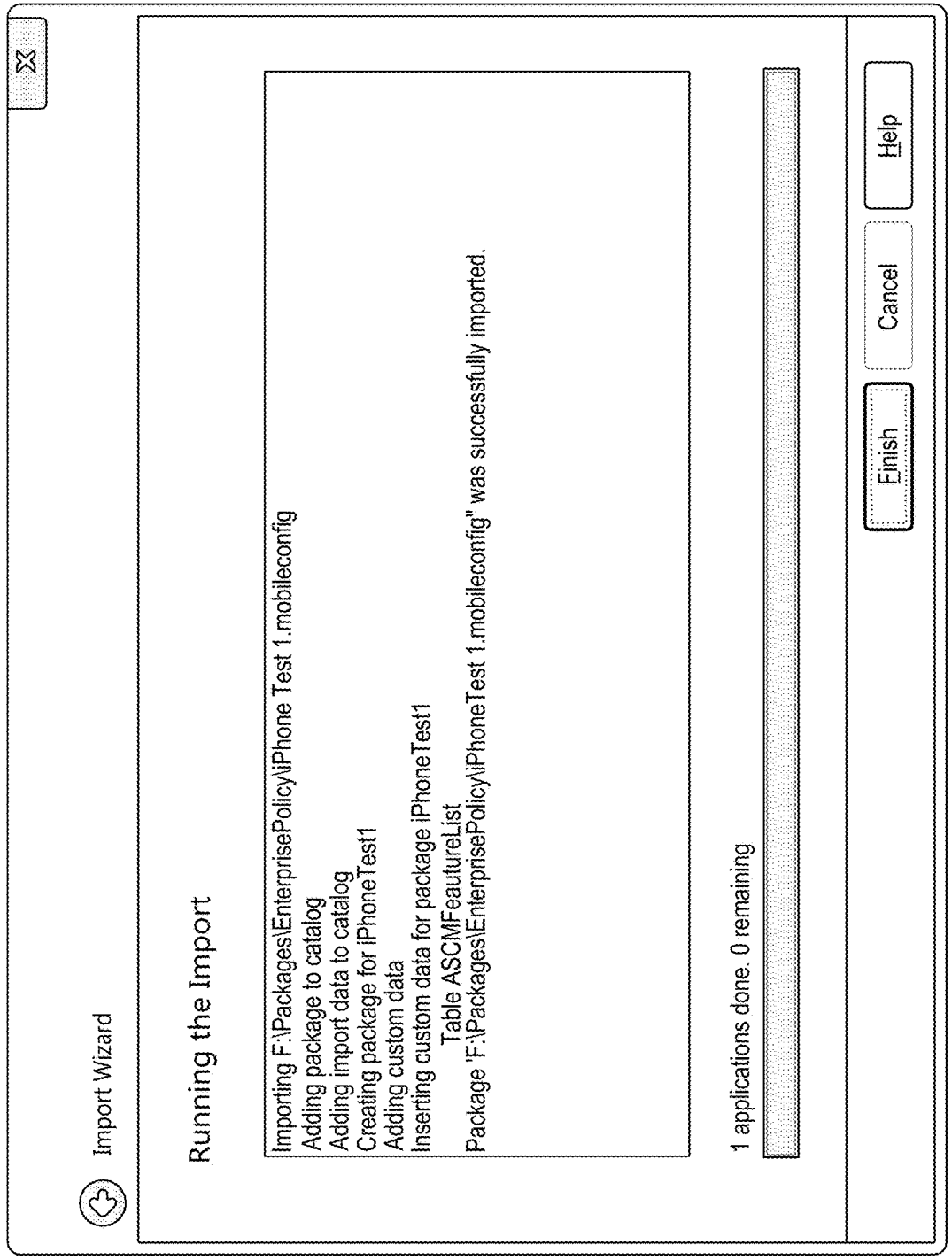

FIGS. 5A-5R provide a series of screen shots that show operation of an embodiment of the invention, in which FIG. 5A shows extraction of metadata from a package; FIG. 5B shows selection of an import method; FIG. 5C shows selection of a type of package to import; FIG. 5D shows selection of a file to import; FIG. 5E shows selection of an organizational folder; FIG. 5F shows a summary panel; FIG. 5G shows extraction of metadata from a package; FIG. 5H shows the package information that is extracted; FIG. 5I shows selection of tests to run; FIG. 5J shows selection of tests; FIG. 5K shows executing the configured tests; FIG. 5 L shows a test center deployment type view; FIG. 5M shows review and suppression of results; FIG. 5N shows the import of an enterprise policy; FIG. 5O shows selection of a file; FIG. 5P shows a summary panel; FIG. 5Q shows a policy file import; and FIG. 5R shows enterprise policy file data.

FIGS. 6A-6D provide a series of reports generated by an embodiment of the invention, in which FIG. 6A shows most used iOS features; FIG. 6B shows comparison of an App to devices; FIG. 6C shows comparison of an App to operating system compatibility; and FIG. 6D shows comparison of an App to enterprise policies.

Features

The following is an example of features for the Apple .IPA file format. Those skilled in the art will appreciate that this is an example of a feature set and that other platforms, such as Android® also have feature sets.

Computer Implementation

FIG. 7 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a Web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 300 may include one or more central processing units ("processors") 305, memory 310, input/output devices 325, e.g. keyboard and pointing devices, touch devices, display devices, storage devices 320, e.g. disk drives, and network adapters 330, e.g. network interfaces, that are connected to an interconnect 315.

In FIG. 7, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 310 and storage devices 320 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 310 can be implemented as software and/or firmware to program one or more processors to carry out the actions described above. In some embodiments of the invention, such software or firmware may be initially provided to the processing system 300 by downloading it from a remote system through the computing system, e.g. via the network adapter 330.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented process for testing a mobile application that comprises a manifest file and a binary executable file, the process comprising:
    identifying a set of features of the mobile application, wherein identifying the set of features comprises:
        identifying, by execution of a manifest analyzer, a plurality of features specified in the manifest file of the mobile application; and
        identifying an additional feature at least partly by detecting, by execution of a link analyzer, that the binary executable file comprises a string that matches a signature of the additional feature, said additional feature not specified in the manifest file; and
    comparing, by execution of a compliance evaluation module, the identified set of features of the mobile application to a set of features specified by an enterprise policy to determine whether the mobile application complies with the enterprise policy;
    said process performed by execution of program instructions by a computing system.

2. The computer-implemented process of claim 1, wherein the binary executable file is partially encrypted, and the process comprises parsing an unencrypted portion of the binary executable file into strings, and comparing the strings to feature signatures.

3. The computer-implemented process of claim 2, wherein parsing the unencrypted portion into strings comprises extracting library/object/type information from an unencrypted load command.

4. The computer-implemented process of claim 1, wherein identifying the additional feature comprises inferring that the mobile application includes the feature by detecting that the binary executable file comprises a load command for loading a library associated with the feature.

5. The computer-implemented process of claim 1, wherein the additional feature is a microphone usage feature.

6. Non-transitory computer storage having stored thereon a software system that directs a computing system to test a mobile application that comprises a manifest file and a binary executable file, the software system comprising:
    an executable manifest analyzer that directs the computing system to identify features of the mobile application by analyzing the manifest file;
    an executable link analyzer that directs the computing system to identify features of the mobile application by searching the binary executable file for signatures corresponding to libraries loaded by the mobile application, said link analyzer thereby capable of identifying mobile application features that are not detectable from the manifest file; and
    an executable compliance evaluation module that directs the computing system to determine whether the mobile application complies with an enterprise policy at least partly by comparing the mobile application features identified by the executable manifest analyzer and the executable link analyzer to features specified by the enterprise policy.

7. The non-transitory computer storage of claim 6, wherein, when the binary executable file is partially encrypted, the executable link analyzer is capable of detecting features by comparing unencrypted library load commands of the binary executable file to signatures.

8. The non-transitory computer storage of claim 6, wherein the executable link analyzer is capable of inferring that a particular feature exists in the mobile application by identifying, from a library load command of the binary executable file, that the mobile application loads a library associated with the particular feature.

9. The non-transitory computer storage of claim 6, wherein the software system further includes an executable resource analyzer that identifies features of the mobile application by analyzing a peripheral file used by the mobile application.

* * * * *